United States Patent [19]
Norfleet

[11] 3,843,779

[45] Oct. 22, 1974

[54] PROCESS FOR PREPARING STABLE DENTIFRICE

[75] Inventor: James Norfleet, Plainfield, N.J.

[73] Assignee: Colgate-Palmolive Company, New York, N.Y.

[22] Filed: Jan. 15, 1973

[21] Appl. No.: 323,667

Related U.S. Application Data

[63] Continuation of Ser. No. 127,051, March 22, 1971, abandoned.

[52] U.S. Cl. ................................................. 424/54
[51] Int. Cl. ............................................. A61k 7/16
[58] Field of Search ..................................... 424/54

[56] References Cited
UNITED STATES PATENTS
3,574,823   4/1971   Roberts et al. ...................... 424/49

OTHER PUBLICATIONS
Harry, The Principles and Practice of Modern Cosmetics, Vol. 1, Published by Chemical Publishing Co., Inc., New York, 1962, p. 265.

Merk Index, 7th ed., published by Merck & Co., Inc., Rahway, N. J., 1960, pp. 236–237.

Primary Examiner—Richard L. Huff
Attorney, Agent, or Firm—Herbert S. Sylvester

[57] ABSTRACT

Process for stabilizing dentifrice containing alkali metal carboxyalkyl cellulose and 1,6-di-(p-chlorophenyl biguanidohexane) salt against precipitation and floculation comprising adding to alkali metal carboxyalkyl cellulose, water and a humectant, to which a water-soluble surface-active agent, such as sodium N-lauroyl sarcosinate, is added, a non-toxic water soluble salt of 1,6-di-(p-chlorophenyl biguanidohexane). The salt of 1,6-di-(p-chlorophenyl biguanidohexane) may be added together with or after the surface-active agent. The remaining dentifrice components such as polishing agent may be added before or after the surface-active agent.

14 Claims, No Drawings

PROCESS FOR PREPARING STABLE DENTIFRICE

This is a continuation of applicantion Ser. No. 127,051, filed Mar. 22, 1971, and now abandoned.

This invention relates to a process for stabilizing a dentifrice against precipitation and flocculation. More particularly, it relates to stabilization of a dentrifrice dentifrice which promotes oral hygiene.

In accordance with the process of the instant invention, a dentifrice containing a water-soluble non-toxic acid addition salt of the highly desirable antibacterial agent, 1,6-di-(p-chlorophenyl biguanidohexane), is provided. This antibacterial agent is known to possess highly desirable effect in inhibiting the growth of many microorganisms such as *Lactobacillus acidophilus* and has, therefore, been recommended for incorporation into dentifrices.

However, the cosmetic stability of a dentifrice containing this antibacterial agent and an alkali metal carboxyalkyl cellulose is not satisfactory in view of incompatibility of these materials which leads to precipitation and flocculation in the dentifrice composition.

It is an advantage of the instant invention that a process for preparing the stable dentifrice including a salt of 1,6-di-(p-chlorophenyl biguanidohexane) and alkali metal carboxyalkly cellulose is provided. Other advantages of the invention will be apparent from consideration of the following specification.

In accordance with certain of its aspects, this invention relates to a process for preparing a stable dentifrice comprising adding a water-soluble non-toxic acid addition salt of 1,6-di-(p-chlorophenyl biguanidohexane) to a blend of alkali metal carboxyalkyl cellulose, water, a humectant, and water-soluble surface-active agent and also mixing with these components a dentally acceptable water-soluble polishing material.

Any non-toxic water-soluble salt of 1,6-di-(p-chlorophenyl biguanidohexane) antibacterial agent may be employed in the practice of the instant invention and is added together with or subsequent to blending the surface-active agent with the carboxyalkyl cellulose and the humectant. The preferred acid addition salts are the gluconate, acetate, fluoride, dihydrogen fluoride and the like. The antibacterial agent is employed in amount such that the finished dentifrice contains about 0.01–5% by weight, preferably about 0.05–1% by weight of the agent. These amounts refer to the quantity of the free base form of the agent.

Dentifrices such as transparent or translucent gels or toothpastes or dental creams include a gelling agent. Alkali metal carboxyalkyl celluloses, and particularly sodium carboxymethyl cellulose, are particularly desirable gelling agents in dentifrice gels and pastes. In accordance with the process of this invention dentifrices containing 1,6-di-(p-chlorophenyl biguanidohexane) salts and alkali metal carboxyalkyl cellulose are stabilized against precipitation and flocculation.

The alkali metal carboxyalkyl cellulose is a hydrophilic colloid which is soluble or dispersible in water and is generally classified as water soluble. It is preferred to use the alkali metal of a carboxyalkyl cellulose having up to three carbon atoms in the alkyl group, such as the sodium and potassium salt of carboxymethyl cellulose. Sodium carboxymethyl cellulose and the like are available usually in the form of powders in various grades of purity and viscosity in solution. Commercial grades of sodium carboxymethyl cellulose having a purity from about 40 to 100% on a dry basis and which are of low, medium or high viscosity may be important. The degree of substitution of the carboxymethyl group per anhydroglucose unit in the cellulose molecule is variable, but may be in the range from about 0.5 to 2. Another water soluble carboxyalkyl cellulose salt which may be important is sodium carboxyethyl cellulose. The carboxyalkyl cellulose agent is present in the finished dentifrice in amount of about 0.2–10% and preferably about 0.2–5% by weight.

The alkali metal carboxyalkyl cellulose gelling agent is mixed with a humectant, such as glycerine, sorbitol, propylene glycol polyethylene glycol 400, including suitable mixtures thereof. Preferably the humectant is glycerine or a mixture of glycerine and sorbitol. When it is desired to form a transparent or translucent gel dentifrice, the humectant content of such a dentifrice is typically about 20–89.74% by weight, preferably about 15–80%, of the finished dentifrice. When it is desired to form an opaque dental cream the humectant content is typically about 15–80% by weight, preferably about 15–35% of the finished dentifrice. Typically, a gel which is transparent or translucent contains 0 - about 80% weight of glycerine and about 20–80% by weight of sorbitol. In opaque dentifrice, the gel typically contains about 15–35% by weight of glycerine. Water is typically present in amount of about 1–60% by weight, typically about 1–30 % in a gel dentifrice and about 15–60 in a paste dentifrice. It may be supplied in whole or in part together with sorbitol which may be employed as a 70% by weight aqueous solution thereof.

In the process of the instant invention synthetic organic surface-active agent is blended with the carboxyalkyl cellulose gelling agent water and humectant, together with or prior to addition of the salt of the antibacterial agent. Preferably the surface-active agent acts in cooperation with the antibacterial agent to improve oral hygiene, assist in achieving thorough and complete dispersion of the component of the dentifrice throughout the oral cavity, and render the dentifrice more cosmetically acceptable. When an anionic surface-active material is desired substantially saturated higher aliphatic acyl amides of lower aliphatic amino, carboxylic acid compounds such as those having 12 to 6 carbons in the fatty acid, alkyl or acyl radicals are particularly preferred. Examples of the last mentioned amides are N-lauroyl sarcosine, and the sodium, potassium and ethanolamine salts of N-lauroyl, N-myristoyl or N-palmitoyl sarcosine which should be substantially free from soap or similar higher fatty acid material which tends to substantially reduce the effect of these compounds. The use of these sarcosinate compounds in dentifrice compositions of the present invention is particulary advantageous since these materials exhibit a prolonged and marked effect in the inhibition of acid formation in the oral cavity due to carbohydrates breakdown in addition to exerting some reduction in the solubility of tooth enamel in acid solutions.

Other particularly suitable surface-active materials include nonionic agents such as condensates of sorbitan monostearate with approximately 60 moles of ethylene oxide, condensates of ethylene oxide with propylene oxide condensates of propylene glycol (available under the trademark "Pluronics") and amphoteric agents such as quaternized imidazole derivatives which are available under the trademark "Miranol" such as Miranol C₂M. Cationic surface-active germicides and antibacterial compounds such as di-isobutylphenoxyethoxyethyl dimethyl benzyl ammonium chloride, benzyl dimethyl stearyl ammonium chloride, tertiary amines, having one fatty alkyl group (of from 12 to 18 carbon atoms) and two (poly) oxyethylene groups attached to the nitrogen (typically containing a total of from about 2 to 50 ethanoxy groups per molecule) and salts thereof with acid and compounds of the structure $$R-N{\overset{\displaystyle (CH_2CH_2O)_xH}{\underset{\displaystyle (CH_2CH_2O)_yH}{-CH_2CH_2CH_2N{<}{(CH_2CH_2O)_xH}}}}$$

where R is a fatty alkyl group containing from about 12 to 18 carbon atoms, and $x$, $y$, and $z$ total 3 or higher, as well as salts thereof with mineral or organic acids, may also be used. It is preferred to use the foregoing surface-active materials in amount of about 0.05–5% by weight of the dentifrice.

Besides the water-soluble, non-toxic acid addition salt of 1,6-di-(p-chlorophenyl biguanidohexane), water is present in the dentifrice. Generally, when the salt of the antibacterial agent is commercially available in aqueous solution, as is the gluconate salt of 1,6-di-(p-chlorophenyl biguanidohexane), water is added as the solvent simultaneously with the salt. When the salt is commercially available in solid form, as are the acetate and fluoride salt, water is subsequently added or the salt is first dissolved in water.

Any suitable substantially water-insoluble dentally acceptable polishing agent may be blended in the dentifrice components at any time. There is a relatively large number of such materials. Representative materials include, for example, dicalcium phosphate, tricalcium phosphate, insoluble sodium metaphosphate, aluminum hydroxide, crystalline silica, colloidal silica, alkali metal alumino silicate complexes, magnesium carbonate, calcium carbonate, calcium pyrophosphate, bentonite, etc., including suitable mixtures thereof. It is often desired to use the substantially water-insoluble phosphate salts as the polishing agents, and also more particularly, aluminum hydroxide, such as the hydrated alumina sold by Alcoa as (333, and crystalline silica polishing agents are highly desirable. In translucent and transparent gels, colloidal silicas such as those having a particle size of about 1–65 microns including Syloids 63, 72 and 74, alkali metal alumino- silicate complexes, such as sodium alumino-silicate complexes having refractive indicies, of about 1.44–1.47, a mol ratio of silica to alumina of about 15:1, up to about 20% by weight of moisture and up to about 10% by weight of sodium oxide are particularly preferred.

The polishing agent content is variable, but will generally be up to about 75% by weight of the total composition, typically about 20–75% by weight in pastes and about 5–50% by weight in transparent or translucent gels.

In the dentifrice, liquids and solids are proportioned to form a creamy or gelled mass of desired consistency which is extrudable from an aerosol container or a collapsible, i.e., aluminum or lead tube.

Various other materials may be incorporated in the dentifrices of this invention. Examples thereof are coloring or whitening agents, preservatives, silicones, chlorophyll compounds, ammoniated materials such as urea, and mixtures thereof, and other constituents. These adjuvants are incorporated in the instant composition in amounts which do not substantially adversely affect the properties and characteristics desired and are selected and used in proper amount depending upon the particular type of preparation involved. For example, ammoniated materials such are urea, are typically employed in amount of about 1–2% by weight.

In addition to 1,6-di-(p-chlorophenyl biguanidohexane), dentifrices in accordance with this invention may include additional cationic antibacterial agent such as $N^1$-(4-chlorobenzyl)-$N^5$-(2,4-dichlorobenzyl) biguanide;
p-chlorophenyl biguanide;
4-chlorobenzyhydryl diguanide;
4-chlorobenzyhydrylguanylurea;
N-3-lauroxpropyl-$N^5$-p-chlorobenzylbiguanide;
4-(lauryldimethylammonium-8-(p-chlorobenzyldimethylammonium) octane dichloride;
5,6-dichloro-2,5 guanidinobenzimidazole;
$N^1$-p-chlorophenyl-$N^5$-laurylbiguanide;
5-amino-1,3-bi-(2-ethylhexyl)-5-methylhexahydropyrimidine;

and their non-toxic acid addition salts such as the gluconate and acetate. The total amount of such agents including 1,6-di-(p-chlorophenyl biguanidohexane) is typically about 0.05–5% by weight.

The dentifrice vehicle of the instant invention contains a flavoring oil and may also contain a sweetening agent. Examples of suitable flavoring oil include oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate, perillartine and saccharine. Suitably, flavor alone or together with sweeting agent may together comprise from about 0.01 to 5% or more of the compositions of the instant invention. Sweetening agent may be added together with humectant, or later.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2.KF$), sodium hexafluorostannate, stannous chlorofluoride, sodium fluorosirconate, and sodium monofluorophosphate. These materials, which dissociate or release fluorine-containing ions in water, suitably may be present in an effective but non-toxic amount, usually within the range of about 0.01 to 1% by weight of the water soluble fluorine content thereof.

The dentifrices should have a pH practicable for use. The pH range of about 5 to 9, preferably about 6–8, is considered the most practicable for use. Where reference is made to pH herein, it is intended that such pH determination be made on the paste or gel directly.

Synthetic finely divided silicas such as those sold under the Trademarks Cab-o-Sil M5, Syloid 244, Syloid 266 and Aerosil D200 may also be employed, particularly in gel dentifrices in amounts of about 0.5–20% by weight to promote thickening or gelling and to improve clarity.

The dentifrice of the invention may be further stabilized against separation into liquid and solid phases due to the presence of phosphate ion and flavoring oil by including a stabilizing agent such as a water soluble alkaline earth metal salt of a strong acid e.g. calcium chloride as described in Ser. No. 127,972 of Daniel Colodney and James Norfleet, or ethyl alcohol, as described in Ser. No. 127,971 of Joseph Paul Januszewski and Tayseer George Bahouth, both filed Mar. 22, 1971 and both now abandoned.

The following specific examples are further illustrative of the nature of the present invention, but it is understood that the invention is not limited thereto. The compositions are prepared in the usual manner and all amounts and proportions are by weight unless otherwise specified.

EXAMPLE 1

22.0 parts of glycerine, 18.0 parts water, and 0.20 parts of sodium saccharin are blended with 0.85 parts of sodium carboxymethyl cellulose. 5.714 parts of a 35% by weight solution of sodium N-lauroyl sarcosinate are then added and thoroughly dispersed in the blend. 4.725 parts of a 20% aqueous solution of 1,6-di-(p-chlorophenyl biguanidohexane) digluconate is added to the glycerine, sodium saccharine sodium carboxymethyl cellulose and sodium N-lauroyl sarcosinate.

A dentifrice is completed by blending 47.00 parts of dicalcium orthophosphate dihydrate, and 5.00 parts of calcium carbonate as well as 0.5 parts of calcium chloride and 0.80 parts of the oil of peppermint flavor into the above components.

The dentifrice thus formed remains cosmetically stable over an extended period of time.

When the procedure set forth above is modified so that 4.725 parts of the 20% solution of 1,6-di-(p-chlorophenyl biguanidohexane) digluconate solution is slurried with 5.714 parts of a 35% solution of the sodium N-lauroyl sarcosinate and blended simultaneously with the glycerine, sodium carboxymethyl cellulose, water, and sodium saccharin, to which have also been added the dicalcium phosphate dihydrate, calcium carbonate and calcium chloride, the dentifrice also remains cosmetically stable over an extended period of time.

However, when the first procedure is modified so that the 1,6-di-(p-chlorophenyl biguanidohexane) salt is added before addition of the sodium N-lauroyl sarcosinate, as is conventional, the salt reacts with the carboxymethyl cellulose resulting in precipitation and flocculation in the dentifrice.

EXAMPLE 2

The following gel dentifrices are prepared with the sodium N-lauroyl sarcosinate being added to the glycerine and sodium carboxymethyl cellulose prior to addition of the 1,6-di-(p-chlorophenyl biguanidohexane)-digluconate:

| Components | PARTS A | B |
|---|---|---|
| Glycerine | 22.95 | 15.00 |
| Sodium saccharine | 0.17 | 0.17 |
| Sodium carboxymethyl cellulose | 0.70 | 0.70 |
| Sorbitol (70%) | 36.49 | 44.95 |
| Syloid 244 silica | 3.00 | 5.00 |
| Syloid 74 silica | 18.00 | — |
| Sodium aluminosilicate complex | — | 16.00 |
| Flavor | 0.80 | 1.00 |
| Sodium N-lauroyl sarcosinate (35%) | 5.714 | 5.714 |
| 1,6-di-(p-chlorophenyl biguanidohexane) digluconate | Q.S.for 0.50 free base | Q.S.for 0.50 free base |
| Water and color | Q.S.to 100 | Q.S.to 100 |

The sodium aluminosilicate employed in gel dentifrice B above is a complex having a refractive index of 1.46, a moisture content of about 6%, a mole ratio of silica to alumina of 15:1 and a sodium oxide content of 7%.

The dentifrices of this example are cosmetically stable over an extended period of time.

It will be apparent to one skilled in the art that various modifications may be made to the above examples.

I claim:

1. A process for preparing a dentifrice stable against precipitation and flocculation comprising adding to a blend of about 0.2–10% by weight of alkali metal carboxyalkyl cellulose, a humectant and water, a water-soluble surface active agent and a water-soluble non-toxic acid addition salt of 1,6-di-(p-chlorophenyl biguanido) hexane in about 0.01–5% by weight of the free base thereof, said acid addition salt being added to said blend (after the addition of) in aqueous solution no sooner than said surface-active agent (or simultaneously with the addition of said surface-active agent), and also mixing with these components a dentally-acceptable water-insoluble polishing material; said percentages being based on said dentifrice composition.

2. The process claimed in claim 1 wherein said acid addition salt is added to said blend after addition of said surface-active agent.

3. The process claimed in claim 1 wherein said acid addition salt is added to said blend simultaneously with the addition of said surface active agent.

4. The process claimed in claim 1 wherein said alkali metal carboxyalkyl cellulose is sodium carboxymethyl cellulose.

5. The process claimed in claim 1 wherein said surface-active agent is sodium N-lauroyl sarcosinate.

6. The process claimed in claim 1 wherein based on 100% by weight of the dentifrice there are employed about 15–80% by weight of said humectant, about 0.2–10% by weight of said alkali-metal carboxyalkyl cellulose, about 0.05–5% by weight of said surface-active agent, amount of said acid addition salt to provide about 0.01–5% by weight of the free base form of said acid addition salt, and about 20–75% by weight of said polishing material.

7. The process claimed in claim 1 wherein said humectant is selected from the group consisting of glycerine, sorbitol, propylene glycol and polyethylene glycol 400 and mixtures thereof.

8. The process claimed in claim 7 wherein said humectant is glycerine.

9. The process claimed in claim 7 wherein said humectant is a mixture of glycerine and sorbitol.

10. A process for preparing a dentifrice stable against precipitation and floculation comprising adding to a blend of about 0.2–10% by weight of alkali metal carboxyalkyl cellulose, about 15–80% by weight of a humectant comprising glycerine and water, about 0.05–5% by weight of sodium N-lauroyl sarcosinate and a water-soluble non-toxic acid addition salt of 1,6-di-(p-chlorophenyl biguanido) hexane in about 0.01–5% by weight of the free base thereof, said acid addition salt being added to said blend (after the addition of said surface-active agent or simultaneously with the addition of said surface-active agent,) in aqueous solution no sooner than said sodium N-lauroyl sarcosinate, and also mixing with these components up to about 75% by weight of a dentally acceptable water-insoluble polishing material; said percentages being based on the weight of said dentifrice composition.

11. The process claimed in claim 10 wherein said acid addition salt is added to said blend after addition of said sodium N-lauroyl sarcosinate.

12. The process claimed in claim 10 wherein said humectant also includes sorbitol.

13. The process claimed in claim 10 wherein said acid addition salt is added to said blend simultaneously with the addition of said sodium N-lauroyl sarcosinate.

14. The process claimed in claim 13 wherein said polishing material is selected from the group consisting of colloidal silica and alkali metal aluminosilicate complex.

* * * * *